United States Patent [19]

Richardson et al.

[11] Patent Number: 4,735,013

[45] Date of Patent: * Apr. 5, 1988

[54] APPARATUS AND METHOD FOR DIRECT APPLICATION OF TREATMENT LIQUID TO GROWING VEGETATION

[76] Inventors: John W. Richardson; John S. Richardson, both of Rte. 3, Box 81, Colfax, La. 71417

[*] Notice: The portion of the term of this patent subsequent to Apr. 22, 2003 has been disclaimed.

[21] Appl. No.: 854,310

[22] Filed: Apr. 21, 1986

Related U.S. Application Data

[63] Continuation-in-part of Ser. No. 493,263, May 10, 1983, Pat. No. 4,583,318.

[51] Int. Cl.4 .................. A01C 15/00; A01G 13/00
[52] U.S. Cl. ................................... 47/1.5; 47/1.7
[58] Field of Search .......... 47/1.5, 1.7, 57.5, DIG. 11; 119/157

[56] References Cited

U.S. PATENT DOCUMENTS

| | | | |
|---|---|---|---|
| 4,349,988 | 9/1982 | Ketula et al. | 47/1.5 |
| 4,426,807 | 1/1984 | Maddock | 47/1.7 X |
| 4,443,970 | 4/1984 | Randolph | 47/1.5 |
| 4,513,528 | 4/1985 | Dale | 47/1.5 |
| 4,583,318 | 4/1986 | Richardson et al. | 47/1.5 |
| 4,642,937 | 2/1987 | McKelvey | 47/1.5 |

*Primary Examiner*—Robert A. Hafer
*Assistant Examiner*—D. Neal Muir
*Attorney, Agent, or Firm*—Cushman, Darby & Cushman

[57] ABSTRACT

An applicator is mounted to a transverse boom carried by a tractor and moved through a field at such a height as to directly contact target vegetation above a selected level, and avoid application of treating liquid to any shorter, desirable vegetation. The applicator includes an outlet manifold, a plurality of receivers connected to an inlet manifold, a respective plurality of generally vertically oriented, transversally spaced non-porous applicator rods each extending between the outlet manifold and a respective receiver, an elevated reservoir for treating liquid, and a pump for recirculating back to the reservoir excess treating liquid which has flowed down outsides of the rods and into the receivers without having been brushed-off onto vegetation contacted by the rods. The outlet manifold and receivers are provided with filters, and each receiver is provided with a trash shield, all for preventing clogging and for facilitating clean-out of the treating liquid flow path. Each applicator rod at its upper end is grooved in a way that facilitates spreading of the treating liquid on the rod while minimizing spillage.

19 Claims, 2 Drawing Sheets

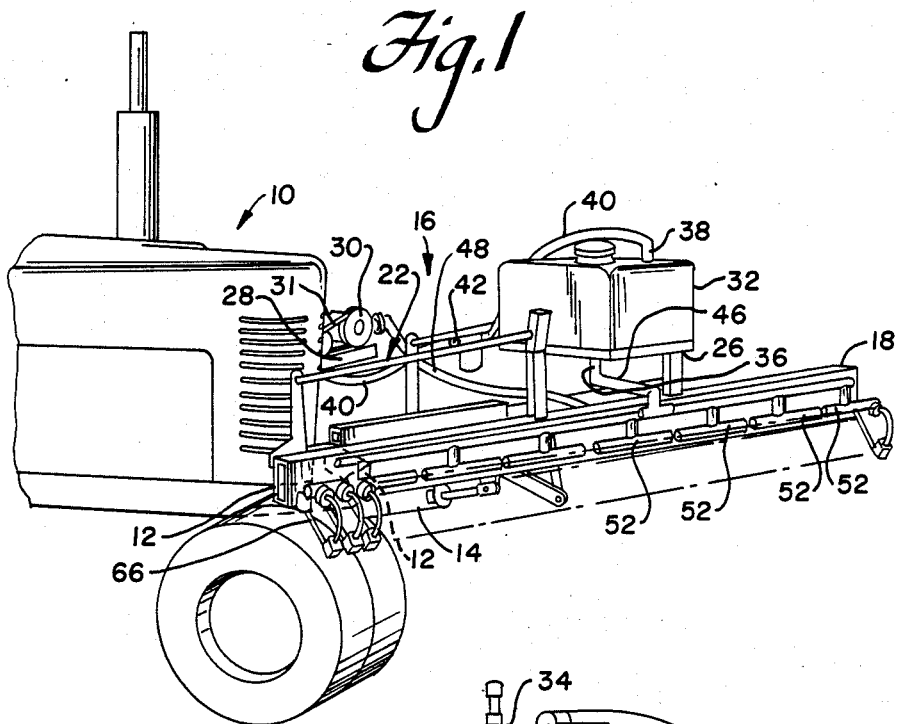
Fig. 1
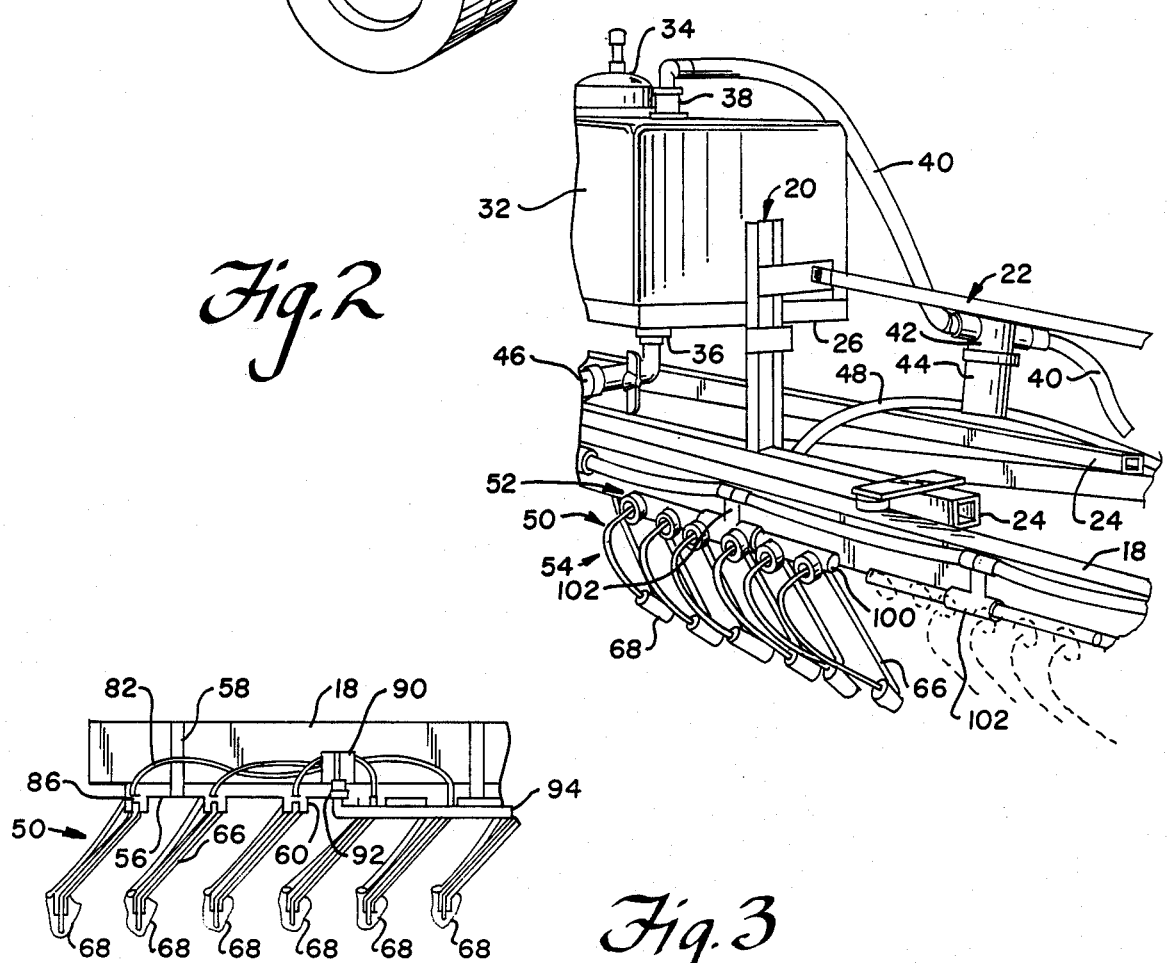
Fig. 2
Fig. 3

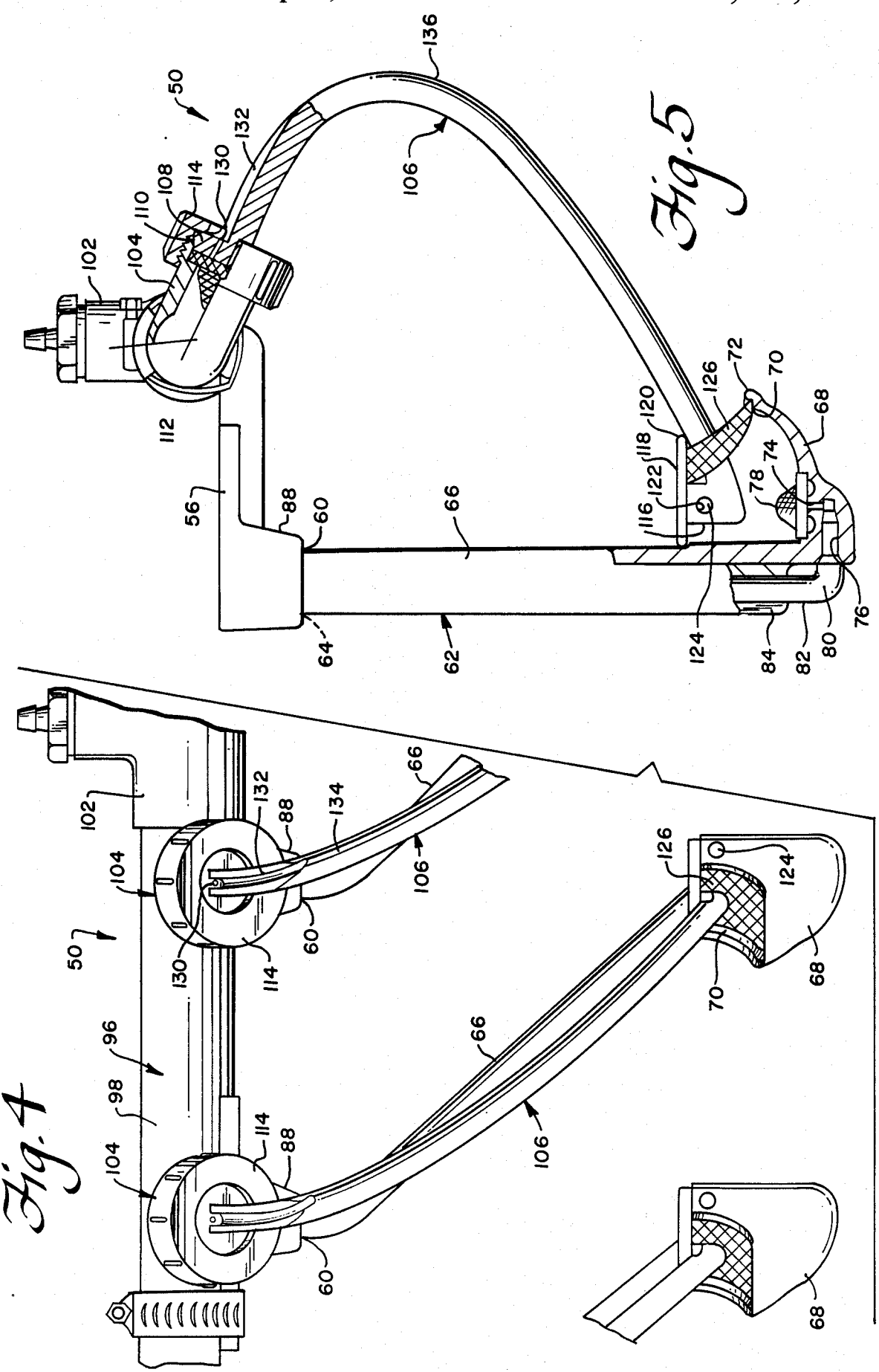

APPARATUS AND METHOD FOR DIRECT APPLICATION OF TREATMENT LIQUID TO GROWING VEGETATION

REFERENCE TO RELATED APPLICATION

This is a continuation-in-part of our copending U.S. patent application Ser. No. 493,263, filed May 10, 1983 (now U.S. Pat. No. 4,583,318, issued Apr. 22, 1986), the entire disclosure of which is incorporated herein by reference.

BACKGROUND OF THE INVENTION

In our aforesaid earlier copending application, we have disclosed an applicator unit which is adapted to be moved through a field of growing vegetation, for instance as an implement mounted across the front of a farm tractor. The unit includes a horizontal, laterally extending outlet manifold ranked above a similarly arranged inlet manifold. Between each manifold a plurality of forwardly convex knee-like non-porous rod members are mounted. In use, a treatment liquid to be directly applied to vegetation is arranged to run out of the outlet manifold in a superficial sheet along the external surface of each rod. As vegetation is grazed by the rods, some of the treatment liquid is wiped onto the vegetation. Any treatment liquid which is not thus wiped onto vegetation is collected from the lower ends of the rods into the inlet manifold and pumped back up to a reservoir from which it flows to the outlet manifold. By preference each knee-like rod is disposed at an incline as seen in front elevation in order to decrease the chance that a tall thin plant can pass untreated between two adjacent rods. A valving system is provided to prevent air entry on inlet side of the pump.

The shortcomings of prior art systems for applying liquids to growing vegetation, including spray systems, mopping and wiping systems, especially those using wicks, and atomizer, mist and fogging systems are discussed in greater detail in our aforesaid earlier copending application.

As further development work leading to commercialization of their invention has been undertaken, the inventors have devised ways and means for further improving the apparatus and method which is disclosed in their aforesaid earlier copending U.S. patent application.

SUMMARY OF THE INVENTION

An applicator is mounted to a transverse boom carried by a tractor and moved through a field at such a height as to directly contact target vegetation above a selected level, and avoid application of treating liquid to any shorter, desirable vegetation. The applicator includes an outlet manifold, a plurality of receivers connected to an inlet manifold, a respective plurality of generally vertically oriented, transversely spaced non-porous applicator rods each extending between the outlet manifold and a respective receiver, an elevated reservoir for treating liquid, and a pump for recirculating back to the reservoir excess treating liquid which has flowed down outsides of the rods and into the receivers without having been brushed-off onto vegetation contacted by the rods. The outlet manifold and receivers are provided with filters, and each receiver is provided with a trash shield, all for preventing clogging and for facilitating clean-out of the treating liquid flow path. Each applicator rod at its upper end is grooved in a way that facilitates spreading of the treating liquid on the rod while minimizing spillage.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 1 is a small scale perspective veiw of a farm tractor having liquid treatment applicator apparatus of the present invention mounted thereon;

FIG. 2 is a larger scale fragmentary perspective view of the tractor-mounted apparatus of FIG. 1;

FIG. 3 is a fragmentary rear elevational view thereof on approximately the same scale as FIG. 2;

FIG. 4 is an even larger scale fragmentary front elevational view thereof; and

FIG. 5 is a fragmentary transverse vertical sectional view thereof on approximately the same scale as FIG. 4.

DETAILED DESCRIPTION

In general, the farm tractor 10 or other self-propelled ground-travelling vehicle is shown provided with an implement mounting frame 12, e.g. at its front, and with an implement height-adjuster e.g. in the form of a hydraulically-operated piston and cylinder arrangement 14 shown mounted to the tractor near the frame 12 and extending forwardly. These elements all are conventional, and the piston and cylinder arrangement is adapted to be conventionally telescopically extended and retracted by the vehicle operator from the driver's control console.

The agricultural implement or apparatus 16 is shown including a horizontally, transversely extending boom 18 which is preferably made of steel or other box channel of the type conventionally used in the manufacture of structural frame elements of farm implements.

This boom, which typically is several feet long, i.e. in the width direction of the tractor, is shown removably mounted to the frame 12 of the tractor 10 by means of a cantilevered parallelogram linkage system 20.

This linkage system 20, is shown including left and right side four-bar linkages 22, respective links of which are rigidly connected for coordinate movement and bracing by crossbars 24. The boom 18 is mounted to the crossbar which connects the lower ends of the front vertical bars of the side linkages 22. And the linkage system 20 is mounted to the tractor frame 12 by means of the crossbar which connects the lower ends of the rear vertical bars of the side linkages 22. The piston/cylinder arrangement 14 angles up to connect medially with a crossbar of the linkage system 20 towards the front of the linkage system 20, so that as the piston/cylinder arrangement is extended and retracted, the effect is to vertically raise and lower the front vertical bars of the side linkages, and thus the boom 18. One crossbar interconnecting the front vertical bars of the side linkages 22 towards the upper ends thereof is provided in the form of a shelf 26. Suitable grommets, connectors, other shock absorbing members and the like can be provided for this linkage system 20, the main purpose of which is to cantilever the boom 18 out front of the tractor at a selectable height. The linkage system 20 also mounts the reservoir for the treatment liquid, as is described below.

A bracket 28 is shown mounted on one side of the tractor 10 near the front and a belt-drive pump 30 is shown mounted to the tractor via the bracket 28. The drive belt 31 is also entrained about a power take-off pulley (not shown) of the tractor. The pump 30, as is conventional, has inlet (suction) and outlet (pressure) ports and functions as a recirculation pump to collect treatment liquid which has flowed on the outsides of the rods, to be described, without being rubbed-off onto vegetation, and to return that excess to an elevated reservoir from which it may flow by gravity.

The foregoing elements preferably are made mainly of the same types of steel or aluminum channel and plate, painted if need be with conventional farm implement protective paint. The remainder of the apparatus 16 may be made mainly of molded plastic, e.g. fiber-reinforced nylon, polypropylene tubing and the like, with metal parts where needed.

The apparatus 16 is shown further including a reservoir 32, e.g. in the form of a closed container made of synthetic plastic material, e.g. which is somewhat translucent so that the operator can observe through its walls the level of treatment liquid contained in it. The container has an openable closure cap 34 which may include a vent and/or a float-type liquid level indicating device. The container 32 is shown including an outlet port 36 in its bottom wall and an inlet port 38 in its top wall. The inlet port 38 is shown connected with the pressure side of the pump 32 by means of a line of flexible plastic tubing 40 which preferably is transparent or translucent (as is all of the tubing for the apparatus 16), so that obstructions or other unusual events can be easily visually monitored on an ongoing basis. By preference, a conventional liquid filter 42 with a transparent clean-out trap 44 is incorporated in the line 40.

The outlet port 36 of the reservoir 32 is shown provided with a tube 46 leading to a medial location on the front of the boom 18. The suction port of the pump 30 is shown provided with a tube 48 leading to a medial location on the rear of the boom 18. The applicator per se 50 of the present invention is located in the system between these medially-located ends of the tubes 46 and 48.

The applicator 50 preferably is made in modular form so that it can be assembled to whatever reasonable length of boom e.g. two to twenty feet that the operator wishes to have. (Of course, a longer boom may need more bracing than that which has been shown in the drawings.) Modular construction also facilitates stocking and shipping of parts; repair and replacement; servicing and maintenance; cleaning, and so on.

The applicator 50 is shown comprising an assembly of seven modular units 52, each of which includes six individual applicators 54. More or less units, and more or less individual applicators per unit could be provided without departing from the principles of the present invention.

Each applicator unit 52 is shown including a molded plastic mounting plate 56 which is shown strapped onto the underside of the boom 18, e.g. using a pair of conventional encircling ties or straps 58 made of metal or plastic. Each mounting plate is shown including six downwardly opening sockets 60. Each socket mounts the upper end of a respective receiver 62 which may be a molded plastic part.

Each receiver is shown including a base 64 at its upper end, this base being received in the respective socket and retained therein by any convenient means such as screw threading, cooperating bosses and detents, adhesive such as is used by plumbers in installing plastic piping for domestic low pressure water supply, and the like. Each receiver further includes an longated leg 66 which extends vertically downwards and laterally obliquely (e.g. 45 degrees to the right as viewed from the front). Near its lower end, each receiver leg mounts a (for lack of a more graphic term) urinal-like receiver cup 68 which opens forwardly and upwardly at a mouth 70 having a lip 72. Within each receiver cup, at a site located substantially below the lip 72, there is shown provided a floor drain 74 having an outlet port 76 which opens rearwardly, below the leg 66.

The opening of the floor drain 74 is shown protected by a removable domed filter screen member 78 mounted in a circular, threaded bezel 80 which removably threads into the sidewall of the well surrounding the floor drain 74. The filter screen member 78 may be precisely the sort that often comes with automatic clothes washing machines for filtering inlet hot and cold water.

The receiver leg 66 is generally U-shaped in horizontal cross-sectional shape, so that it is closed toward the front and open towards the rear.

A length of flexible plastic tubing 82 has its one end fitted to the outlet port. From there, the tubing extends up through the rearwardly open channel 84 defined by the leg 66, out of the channel 84 at the top and into a clip 86 molded as a rear part of the outside of the boss 88 defining the respective socket 60, then laterally along the back of the boom 18 to a fitting 90 located on the back of the boom 18 centrally of the respective mounting plate 56. As shown, the fitting 90 has six inlet sockets (one for each length of tubing 82 for the respective unit) and an outlet socket. The latter receives an L-fitting or T-fitting 92, as the respective case may be, for collecting the individual lines 82 into a common collection line of tubing 94, e.g. an inlet manifold, connected with the suction tube 48 leading to the pump 30.

Each modular unit 52 is further shown including an outlet manifold 96 mounted to the front face of the boom 18 at a respective location so as to extend lengthwise of the boom e.g. over the same interval as the respective mounting plate 56

Each outlet manifold 96 may be a length of plastic pipe 98, capped at both ends by pipe caps 100, this length of pipe 98 being medially connected with an inlet tee fitting 102. To the left and to the right of the tee 102, the pipe 98 is shown provided with three equally-spaced forwardly and slightly downwardly opening outlet openings having externally pipe-threaded necks 104.

The liquid flow circuit of each individual applicator 54 from the respective outlet neck 104 to the respective receiver cup 68 is completed by an applicator rod 106.

Each applicator rod may be an integral molding of non-porous synthetic plastic material. The preferred shape, which is shown, is difficult to characterize; let us say that it looks like an inverted J, or a side view of one of Popeye's friend Olive Oyl's legs, i.e. with a gentle bend between the thigh and calf. At its upper end, each applicator rod 106 includes a radially extending disk-like flange 108 which is constructed and arranged to be sealingly received against a respective seat 110 in the respective outlet neck 104, with another strainer washer 112 (like the filter 78) interposed between the flange 108 and the seat 110. A molded plastic retainer nut 114 removably screws onto the neck 104 to keep the upper end of the applicator rod sealingly assembled to the respective outlet neck.

At its lower end, the applicator rod 106 is shown including a vertically upwardly projecting boss 116 integrally topped by a receiver cup closure plate 118 having a lip 120 about its outer periphery. The plate 118 as shown is a generally horizontal, flat element, and the boss 116 is seen to have an opening 122 formed laterally through it midway up its vertical extent.

Each applicator rod 106 is mounted to the respective receiver so that its low end, at the foot of the boss 116 is disposed in the respective receiver cup 68, directly over the respective floor drain 74. This closed relationship is maintained by a pin 124 which is fitted laterally through a corresponding opening in the sidewall of the receiver cup and removably maintained in place by suitable means such as a friction fit.

The plate 118, when in place, does not completely close the mouth of the receiver cup, only its upper part; the forward part of the mouth remains open, rimmed by part of the lip 72 of the plate 118. It is through this opening that the lower end of the applicator rod 106 projects into the receiver cup. However, in order to prevent leaves, twigs or similar trash from so filling the receiver cup that liquid running down the applicator rod 106 would run onto the outside of the receiver cup and drip onto the ground rather than being collected in the receiver cup, the receiver cup open mouth portion between the lips 72 and 120 receives a foraminous trash screen 126 the outer periphery of which is fitted under the respective lips 72, 120 and the inner periphery of which closely surrounds the applicator rod 106 where the applicator rod 106 penetrates through the trash screen 126 into the receiver cup. (Of course this region can be easily inspected and cleaned by pulling out the pin 124, thus freeing the plate 118 from the upper rim of the receiver cup and permitting both the trash screen 126 and the strainer washer 112 to be cleaned, serviced or replaced.)

It should now be noticed that there is a bore 130 formed through the thickness of the flange 108 opening into an upwardly opening groove 132 formed in the "thigh" portion 134 of the applicator rod 106. The inner end of the bore 130 is so located that liquid must pass through the strainer 112 in order to pass through the bore 130 to reach the channel 132. The channel 132 starts deep, i.e. one-third into the thickness of the rod 106 from top center, then feathers out to nothing, depthwise, before reaching the "knee" portion 136. As seen from the front, each application rod 106 angles to the right at about a 45 degree angle, so that it is generally aligned in front of the respective receiver leg. This causes the apparatus to have the general appearance of a comb, with the boom and manifolds representing the spine and the receivers and applicator rods representing the teeth. This shape permits the apparatus to be combed through a field at a selected height, just as if the upwardly projecting vegetation were a giant head of hair to be combed using a tractor-mounted comb having a liquid reservoir adapted to dribble treating liquid out onto the teeth of the "comb" for application to the "hair".

The reason why the comb teeth preferably all slant to one side is to reduce to a bare minimum the chance that a slender, erect weed or other vegetation to be treated could escape treatment by passing through the gap between two adjoining comb teeth.

It should now be noticed that the channel 132, as it feathers out, curves slightly angularly about the rod towards the upper profile of the rod. The purpose of this last-minute curve is to get the liquid flowing out onto the rod at a site far from where it could easily drip off the rod, in order to better ensure that all of the liquid which flows out onto the outer surface of the non-porous rod 106 will either be brushed-off onto vegetation by direct contact of such vegetation with the rods, or as excess which did not brush off onto vegetation, will drip from the foot of the applicator rod into the receiver cup for recirculation.

The treating liquid may be a pesticide, a fertilizer, a solution of plant growth hormone or any other treating liquid of similar viscosity and wetting characteristics.

Preferably the external surface 106 of each rod is matte finish or knurled or otherwise patterned to promote spreading of liquid thereon and to retard mere flowing to the low side and dripping off of the treating liquid prior to reaching the receiver cup.

The most frequent use of the apparatus of the invention may be to apply a liquid herbicide solution to weeds such as Johnson weed projecting above a cash crop such as soybeans or cotton, e.g. by traversing the field where the crop and taller weeds are growing, with the boom 18 held so high that only the upwardly projecting weeds are contacted, above the tips of the desirable plants. However, where all the vegetation is to be treated, the boom can be lowered so that the liquid is brushed against lower plants.

Of course, the reason why so many filters and trash shields are provided is to facilitate clean out of whatever the filters collect so it does not clog the system, and, particularly in the instance of the trash shields, to prevent the build-up of trash by deflecting it before it can get entrapped.

Float valves may be employed in the liquid circulating tubing, if needed, as outlined in our aforementioned prior application, in order to prevent overflowing of receiver cups when the tractor must tranverse a field which has a lateral slope.

It should now be apparent that the apparatus and method for direct application of treatment liquid to growing vegetation as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. Apparatus for directly applying treating liquid to growing vegetation in a field or the like, comprising:
    at least one generally vertically oriented applicator rod means having a substantially non-porous, exposed external surface capable of supporting a falling film of treating liquid having a free liquid surface on said substantially non-porous, exposed external surface, this at least one rod means being arranged to be moved through a field of growing vegetation at a level above ground level so as to be in position to brush said free liquid surface against such growing vegetation as is to be treated;
    a reservoir for treating liquid;
    first conduit means effectively extending from said reservoir to the vicinity of the respective said external surface of each said applicator rod means, with such juxtaposition as to flow treating liquid onto said external surface without substantial splashing or spraying;

upwardly opening collecting trough means effectively spacedly enclosingly receiving a lower end portion of each said rod means for collecting as drainage therefrom substantially all of such of the treating liquid as has run down the external surface of that rod means without having been removed therefrom by brushing against growing vegetation;

second conduit means communicated with said collecting trough means for recovering collected treating liquid from said collecting trough means;

and pumping means effectively incorporated in the circuit including the reservoir, the first conduit means, said external surface of each said rod means, the collecting trough means and the second conduit means for forwarding treatment liquid along at least one segment of said circuit;

said collecting trough means including an individual receiving cup for each said generally vertically oriented applicator rod means, and a support leg means for each said receiving cup, each said support leg means being generally vertically oriented and arranged substantially in file with the respective said applicator rod means; and a support means having each said support leg and applicator rod means dependingly supported therefrom.

2. The apparatus of claim 1, wherein:
said pumping means is incorporated in said second conduit means.

3. The apparatus of claim 2, wherein:
flow from said reservoir through said first conduit means and onto said rod external surface is by gravity feed.

4. The apparatus of claim 1, further including:
a frame means including a base frame portion adapted to be mounted to a mobile vehicle such as a farm tractor, a movable frame portion having said support means secured thereto; and extensible/retractable support means connecting said movable frame portion with said base frame portion, whereby said applicator rod means may be raised and lowered relative to the vehicle by extending and retracting said extensible/retractable support means.

5. The apparatus of claim 4, wherein:
said pumping means is incorporated in said second conduit means, and said reservoir is mounted on said movable frame at a higher level than said applicator rod means.

6. The apparatus of claim 4, wherein:
each applicator rod means has a substantial bend therein so as to be convex forwardly.

7. The apparatus of claim 6, wherein:
each such bend has a blunt apex located about one-third down the length of the respective applicator rod.

8. The apparatus of claim 7, wherein:
for each said applicator rod means, said vicinity to which said first conduit means extends is substantially transversally displaced from vertical alignment with the respective said individual receiving cup, the applicator rod means slanting transversally from said vicinity to said individual receiving cup.

9. The apparatus of claim 4, wherein:
a plurality of said applicator rod means is provided, these applicator rod means being arranged in a transversally extending series;

said first conduit means includes at least one transversally extending, horizontally oriented outlet manifold having a plurality of outlet nipples spaced therealong in a series;

fitting means securing an upper end portion of a respective said applicator rod means in each said outlet manifold;

each said first conduit means including a throughbore provided through each respective outlet manifold nipple fitting;

a lower end portion of each respective applicator rod means being telescopically received in a corresponding said receiver cup; and means effectively interposed between each applicator rod means lower end portion and the receiver cup in which that lower end portion is telescopically received for radially generally centrallizing and spacing the respective applicator rod means lower end portion relative to the corresponding receiver cup, to prevent treating liquid from running down the outside of the receiver cups.

10. The apparatus of claim 9, wherein:
each said outlet nipple of said at least one outlet manifold is located forwardly of, at a higher level than and laterally to one side of the respectively corresponding receiver cup for the respective said applicator rod means.

11. The apparatus of claim 10, wherein:
said second conduit means includes at least one horizontally oriented inlet manifold located downstream of respective said individual receiver cups;

said support means being constituted by a transversally, horizontally extending boom of substantial width mounted medially to said movable frame so as to extend leftwardly and rightwardly of as well as in line with the vehicle; and means mounting said at least one outlet manifold and said at least one inlet manifold to said boom at respective locations disposed above said support legs, so that said support means and said applicator rod means depend from said boom as do teeth from a comb, with downwardly opening gaps thus being defined between respective adjoining ones of said support legs.

12. The apparatus of claim 11, wherein:
each said receiver cup has a generally upwardly and forwardly opening mouth in through which the respective applicator rod projects to a central location disposed over means defining a floor drain from said receiver cup into said second conduit means; and said mouth of each said receiver cup is removably fitted with a trash shield surrounding the respective said applicator rod, for deflecting vegetation brushed by said apparatus from lodging in and clogging each said receiver cup.

13. The apparatus of claim 1, wherein:
each said receiver cup has a generally upwardly and forwardly opening mouth in through which the respective applicator rod projects to a central location disposed over means defining a floor drain from said receiver cup into said second conduit means; and said mouth of each said receiver cup is removably fitted with a trash shield surrounding the respective said applicator rod, for deflecting vegetation brushed by said apparatus from lodging in and clogging each said receiver cup.

14. The apparatus of claim 13, wherein:
said first and second conduit means include cleanable strainers for catching bits of vegetation which may have passed through a respective said trash shield and into a respective said receiver cup.

15. The apparatus of claim 14, wherein:
said floor drain of each said receiver cup is fitted with a cleanable strainer for catching bits of vegetation which may have passed through a respective said trash shield and into a respective said receiver cup.

16. The apparatus of claim 13, wherein:
each said applicator rod means includes a plate for partially closing an upper end portion of said mouth;
a peripheral portion of said plate cooperating with a respective said receiver cup for maintaining the respective trash screen removably disposed in the respective said receiver cup mouth.

17. The apparatus of claim 16, wherein:
each said applicator rod means includes an upwardly projecting foot portion provided at a lower end thereof within the respective said receiver cup, the respective said plate being formed as a horizontal member on an upper end of the respective said foot, so that treating liquid may drip from the resepctive said lower end of each said applicator rod means within the respective said receiver cup.

18. The apparatus of claim 17, further including:
means removably securing each applicator rod means to the respective said receiver cup via the respective said foot.

19. The apparatus of claim 18, wherein:
each said securing means comprises a pin installed laterally through a sidewall of the respective said receiver cup and laterally through the respective said foot.

* * * * *